(12) United States Patent
Back

(10) Patent No.: US 9,639,525 B2
(45) Date of Patent: May 2, 2017

(54) NARRATIVE GENERATING SCHEME

(71) Applicant: KT Corporation, Seongnam-si, Gyeonggi-do (KR)

(72) Inventor: Soong-joo Back, Seoul (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 199 days.

(21) Appl. No.: 14/563,162

(22) Filed: Dec. 8, 2014

(65) Prior Publication Data
US 2015/0161108 A1 Jun. 11, 2015

(30) Foreign Application Priority Data
Dec. 10, 2013 (KR) .................. 10-2013-0153198

(51) Int. Cl.
G06F 17/27 (2006.01)
G06F 17/28 (2006.01)

(52) U.S. Cl.
CPC ...... G06F 17/2881 (2013.01); G06F 17/2785 (2013.01); *G06F 17/271* (2013.01); *G06F 17/274* (2013.01)

(58) Field of Classification Search
CPC ............ G10L 17/2785; G10L 17/2755; G10L 17/271; G10L 17/274; G10L 17/277
See application file for complete search history.

(56) References Cited

FOREIGN PATENT DOCUMENTS

| KR | 10-0819893 B1 | 4/2008 |
|---|---|---|
| KR | 10-0823234 B1 | 4/2008 |
| KR | 10-2009-0104909 A | 10/2009 |
| KR | 10-2013-0113701 A | 10/2013 |

*Primary Examiner* — Vu B Hang
(74) *Attorney, Agent, or Firm* — Brundidge & Stanger, P.C.

(57) ABSTRACT

In one example embodiment, A narrative method includes registering an application, from among a plurality of applications installed on a mobile device; identifying at least one action corresponding to the application; receiving recorded usage history of the at least one action corresponding to the application; and generating a narrative based on the received usage history of the at least one action corresponding to the application.

20 Claims, 10 Drawing Sheets

| ACTION ID | ACTION |
|---|---|
| 1 | READ |
| 2 | HOLD |
| 3 | RATE |
| 4 | WATCH |
| 5 | LISTEN |
| 6 | DOWNLOAD |
| 7 | PLAY |
| 8 | BUY |
| 9 | GIVE A PRESENT TO |

| APPLICATION ID | APPLICATION TITLE | APPLICATION CATEGORY |
|---|---|---|
| 1 | AMAZON KINDLE STORE | 1 |
| 2 | YAHOO MUSIC | 4 |
| 3 | AMC GRAND | 2 |
| 4 | TNT | 3 |
| 5 | BLUEPAY | 6 |
| 6 | ANGRY BIRD | 5 |

510 — APPLICATION ID
520 — APPLICATION TITLE
530 — APPLICATION CATEGORY

APPLICATION INFORMATION TABLE

| APPLICATION ID | APPLICATION CATEGORY | EXECUTED FUNCTION | EXECUTION TIME | EXECUTION DURATION | EXECUTION LOCATION | OBJECT TITLE | OBJECT TIME | OBJECT LOCATION |
|---|---|---|---|---|---|---|---|---|
| 3 (AMC GRAND) | 2 (MOVIE) | BOOK A TICKET | 14:00 | 00:05 | HOME | DARK NIGHT | 16:00 MOVIE TIME | BEVERLY HILLS |
| 1 (AMAZON BOOKS) | 1 (E-BOOK) | INTEREST (FAVORITE) | 14:10 | 00:01 | HOME | LIFE LESSON | | |
| 1 (AMAZON BOOKS) | 1 (E-BOOK) | READ | 14:10 | 00:30 | HOME | THE GREAT GATSBY | | |

TITLE | CANCEL | SAVE 2013. 8. 28 ▼  PM 3:10 ▼

710 — I AM INTERESTED IN LIFE LESSON. PLEASE PLACE THIS ON HOLD

AUTHOR
★★★★★ 9.0

720 — I HAD READ THE GREAT GATSBY AT 14:00 FOR 30 MINUTES.
I EVENTUALLY FINISHED READING IT, SINCE I STARTED READING IT SIX MONTHS AGO.
I DO NOT LIKE THIS BOOK, BECAUSE IT IS SO BORING.

THE GREAT GATSBY
AUTHOR
RATING
★★★★★ 9.0

730 — IN BEVERY HILLS, I DROPPED BY DUNKIN DONUTS AT 15:00.
I WATCHED DARK NIGHT AT 16:00 IN AMC GRAND.
IT WAS SO EXCITING, AS PEOPLE SAID.

★★★★★ 9.28
DIRECTOR
DARK NIGHT

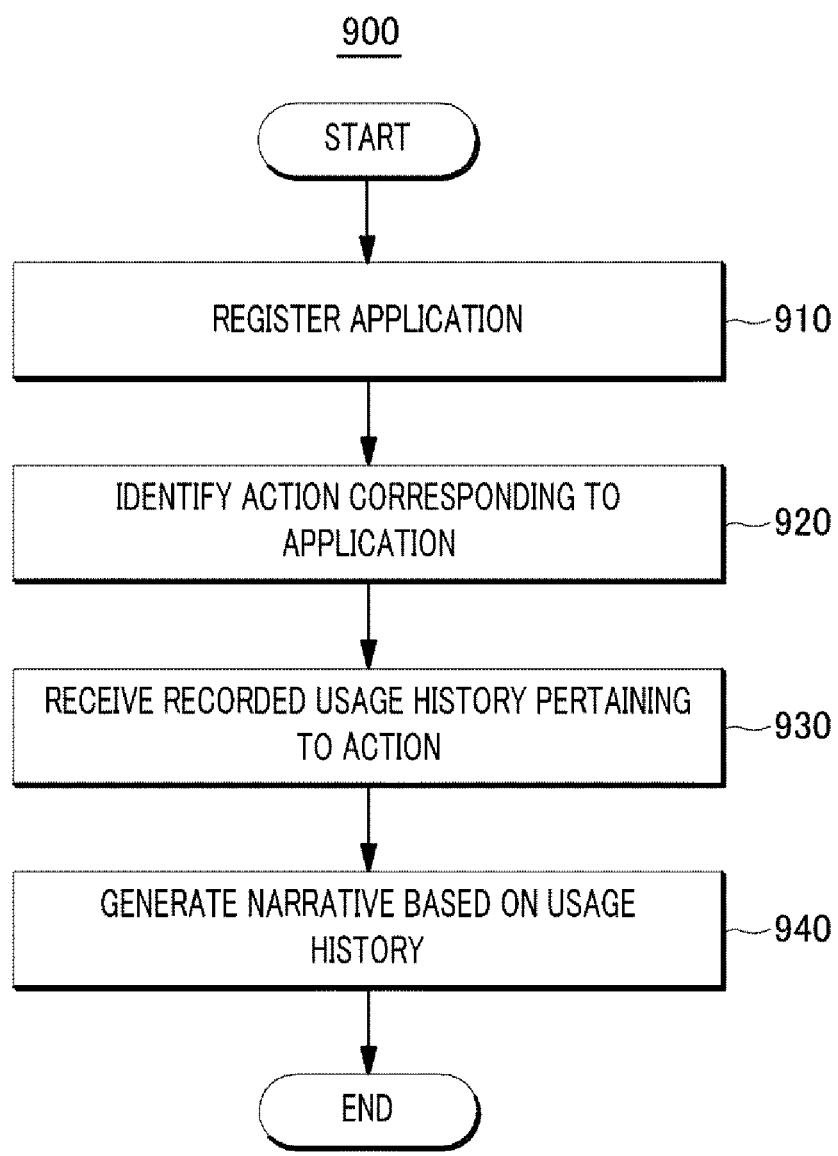

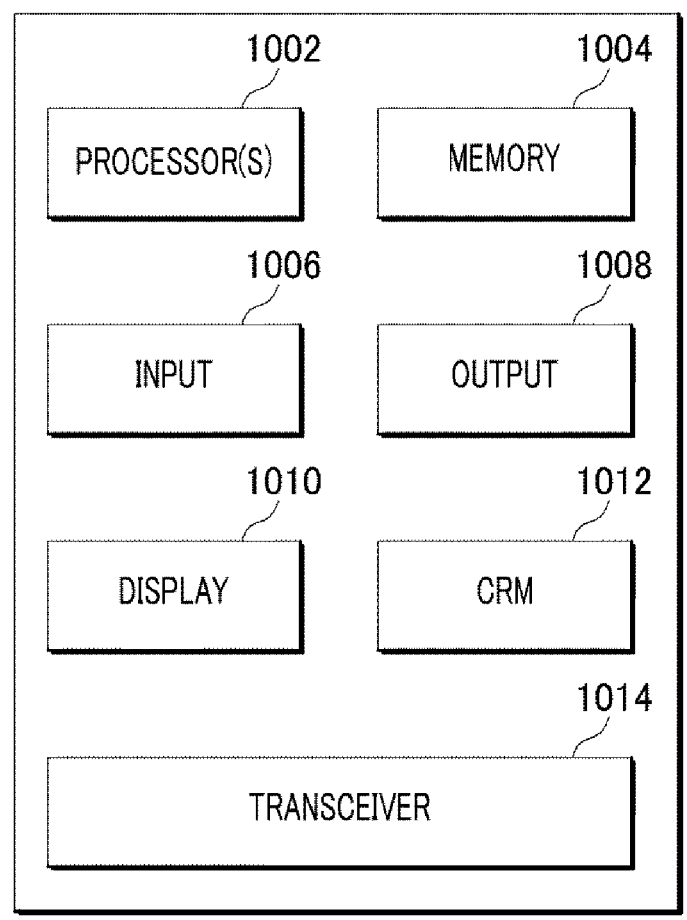

NARRATIVE GENERATING SCHEME

TECHNICAL FIELD

The embodiments described herein pertain generally to a narrative generating scheme.

BACKGROUND

A life log enables a user, using digital devices, to record data pertaining to myriad life experiences via text messages, pictures, video files, and audio files. Alternatively, users may record their experiences through social network services.

SUMMARY

In one example embodiment, a narrative method may include: registering an application, from among a plurality of applications installed on a mobile device; identifying at least one action corresponding to the application; receiving recorded usage history of the at least one action corresponding to the application; and generating a narrative based on the received usage history of the at least one action corresponding to the application.

In another example embodiment, a computing device may include: a memory configured to store narratives; and a processing unit configured to register an application from among a plurality of applications installed on a mobile device, identify at least one action corresponding to the application, receive recorded usage history of the at least one action corresponding to the application, and generate a narrative, based on the received usage history of the at least one action corresponding to the application.

In yet another example embodiment, a computer-readable storage medium having thereon computer-executable instructions that, in response to execution, cause a device to perform operations may include: registering an application from among a plurality of applications installed on a mobile device; identifying at least one action corresponding to the application; receiving recorded usage history of the at least one action corresponding to the application; and generating a narrative, based on the received usage history of the at least one action corresponding to the application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 3 shows an example table implemented by at least portions of a narrative generating scheme, in accordance with various embodiments described herein;

FIG. 5 shows another example table implemented by at least portions of a narrative generating scheme, in accordance with various embodiments described herein;

FIG. 6 shows another example table implemented by at least portions of a narrative generating scheme, in accordance with various embodiments described herein;

FIG. 7 shows an illustrative user interface by which at least portions of a narrative generating scheme may be implemented, in accordance with various embodiments described herein;

FIG. 9 shows an example processing flow of operations, by which at least portions of a narrative generating scheme may be implemented, in accordance with various embodiments described herein; and FIG. 10 shows an illustrative computing device, in which any of the processes and sub-processes of a narrative generating scheme may be implemented as computer-readable instructions stored on a computer-readable medium, in accordance with various embodiments described herein.

DETAILED DESCRIPTION

Figure 1:
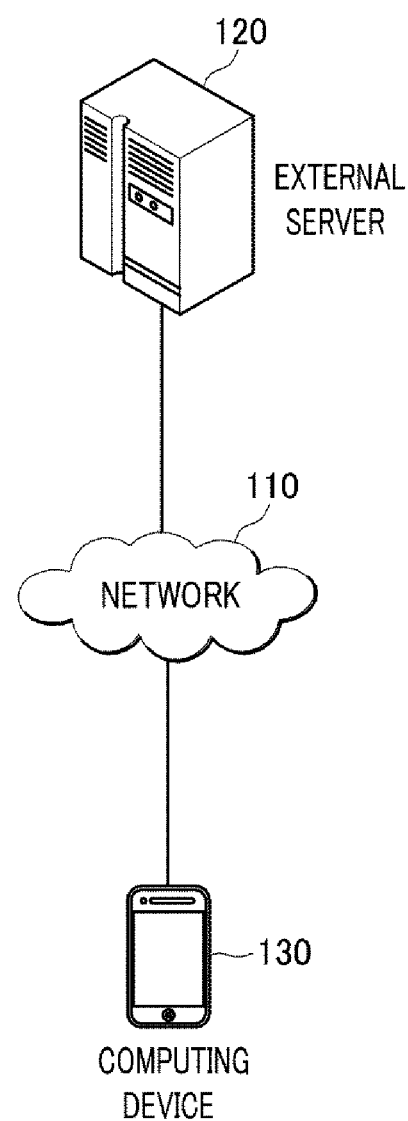
FIG. 1 shows an example system in which one or more embodiments of a narrative generating scheme may be implemented, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 10 in which one or more embodiments of a narrative generating scheme may be implemented, in accordance with various embodiments described herein. As depicted in FIG. 1, system configuration 10 may include, at least, an external server 120, and a computing device 130. At least two or more of external server 120 and computing device 130 may be communicatively connected to each other via a network 110.

Network 110 may be a wired or wireless information or telecommunications network. Non-limiting examples of network 110 may include a wired network such as a LAN (Local Area Network), a WAN (Wide Area Network), a VAN (Value Added Network) or the like. Other non-limiting examples of network 110 may include wireless networks such as a mobile radio communication network, including at least one of a 3rd, 4th, or 5th generation mobile telecommunications network (3G), (4G), or (5G); various other mobile telecommunications networks; a cabling telecommunications network; a fiber optics telecommunications network; a satellite network; WiBro (Wireless Broadband Internet); Mobile WiMAX (Worldwide Interoperability for Microwave Access); HSDPA (High Speed Downlink Packet Access) or the like.

Computing device 130 may include, for example, but not as a limitation, an IPTV (Internet Protocol Television), a Smart TV (Smart TV), a Connected TV, a notebook computer, a personal computer, a smart phone, a digital camera, a remote controller, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal.

As referenced herein, a narrative application, which may alternatively be referred to as a storytelling application, may be regarded as a mobile application installed on computing device 130 to generate story contents based on recorded history of actions.

External server 120 may be configured to receive, from computing device 130, a request for data and to provide the requested data to computing device 130. External server 120 may include one or more servers. The requested data, which may be alternatively referred to as external data because it may be retrieved and/or received from external sources, may be related to a plurality of mobile applications installed and/or running on computing device 130.

For example, if a narrative application installed on computing device 130 receives, transmits, includes, or otherwise makes reference to an electronic book, e.g., E-book, the requested, or external, data may include, as non-limiting examples, a cover of the E-book, information regarding an author of the E-book, on-line ratings of the E-book or links thereto, users' reviews of the E-book, information regarding sales of the E-book, etc stored in external server 120 that a non-stand-alone mobile application selling the E-book may access through application programming interfaces (APIs). External server 120 may be configured to retrieve and/or receive the requested, or external, data from one or more local servers or from associated with other entities; and to transmit the requested, or external, data to the requesting computing device 130.

As another example, if the narrative application receives, transmits, includes, or otherwise makes reference to movie, the requested, or external, data 120 may include, as non-limiting examples, a promotional poster or other graphics for the movie, information regarding the director of the movie, information regarding actors in the movie, on-line ratings of the movie or links thereto, audience reviews of the movie, etc stored in external server 120 that a non-stand-alone mobile application for booking the movie ticket may access through application programming interfaces (APIs). External server 120 may be configured to retrieve and/or receive the requested, or external, data from one or more local servers or from associated with other entities; and to transmit the requested, or external, data to the requesting computing device 130.

Computing device 130 may be operable to download a narrative or storytelling application (hereinafter referred to as "narrative application") to generate a user's narrative or story, from application distribution platforms such as the Apple® App Store, Google® Play, Windows® Phone Store, and BlackBerry® App World. The narrative application may be a computer program designed to run on any implementation of computing device 130.

The narrative application downloaded and hosted on computing device 130, may register a third-party mobile application (hereinafter referred to as "the third-party application"), which may be one of a plurality of mobile applications that are also downloaded from one or more of the application distribution platforms and installed on computing device 130.

According to some embodiments, for example, a user of computing device 130 may drag an icon or representation of the third-party application onto an icon or representation of the narrative application on a user interface (UI) of computing device 130. Then, the narrative application may receive a third party application ID from an OS running on computing device 130 and store the third party application ID. Further, the narrative application may call an API function provided by the third party application to get recorded data regarding the third party application from external server 120 or computing device 130.

Examples of the third-party mobile applications that may be registered to the narrative application may include the "Amazon® Kindle Store" application that facilitates purchases and downloads of E-books, the "Yahoo!® music" application that facilitates purchases and downloads of music, the "AMC® grand" application that facilitates ticket purchases for movies, the "TNT®" application that provides, e.g., viewing guides for the corresponding TV channel, the "BluePay®" application that facilitates mobile payments payment), or the "Angry Bird®" game application.

The registered narrative application may be configured to identify one or more user actions that may be taken while using the registered narrative application. Such actions may be predefined by the narrative application and stored in computing device 130. Further, the actions may be a user defined action implemented by computing device 130.

As an example of identifying at least one action, the registered narrative application may display the predefined list of actions in a drop-down menu of a pop-up window corresponding to the registered application. Then, the narrative application may receive one or more user inputs to select at least one action from the predefined list of actions in the drop-down menu, e.g. by clicking selections of the one or more actions.

As non-limiting example of the actions list, if the narrative application registers "Amazon® Kindle Store", the narrative application may display in, e.g., a pop-up window or drop-down menu, a predefined list of actions, including as non-limiting examples "read," "hold," "like," "dislike," "purchase", "read again", "highlight," "annotate," "preview," etc., using a UI on computing device 130 or the narrative application server.

As another example, if the narrative application registers "Yahoo!® Music" as a mobile music store application, the narrative application may display in, e.g., a pop-up window or drop-down menu, actions that include, as non-limiting examples, "listen," "hold," "purchase," "download", "like," "dislike," "rate," "add to favorites," "remove from favorites," "read a review," "comment," etc.

As another example of identifying at least one action, the narrative application may identify a category of the registered application and display a predefined list of actions stored in computing device 130 corresponding to the category of the application. Then, the narrative application may receive one or more user inputs to select at least one action from the list of actions.

For example, if the narrative application registers "Amazon® Kindle Store" and "Google® eBook", the narrative application may determine based on metadata of the two applications that "Amazon® Kindle Store" and "Google® eBook" are both "E-book" store applications. Then, the narrative application may display the same predefined list of actions corresponding to all registered "E-book" store application.

As still another example of identifying at least one action, the narrative application may receive user-defined actions corresponding to the registered application. After the narrative application displays a list of actions predefined and stored in computing device 130 corresponding to the registered application, the narrative application may receive one or more user inputs to enter new actions associated with the registered third party application.

After the narrative application identifies at least one action, the narrative application may be configured to receive recorded usage history of the at least one action corresponding to the registered third party application transmitted from external server 120 and computing device 130.

The recorded usage history of the at least one action corresponding to the registered application may include an executed function, an execution time, an execution location of the at least one application, along with a title, a starting time, and a location transmitted from external server 120. Further, the recorded usage history of the at least one action corresponding to the application may include an image, a rating, an author, an actor/actress and a review associated with the application.

The information regarding the executed function, the execution time, and the execution location may be stored in computing device 130, and the narrative application may receive such information transmitted from computing device 130 by calling application programming interfaces (APIs), because the usage record of applications installed on computing device 130 may be stored in computing device 130.

On the contrary, the information regarding the title, the starting time, and the location may be stored in external server 120 linked to the registered application, and the narrative application may receive such information transmitted from external server 120 by calling application programming interfaces (APIs). The information regarding a subject matter of the registered application, e.g. e-Book of Amazon® Kindle Store or a movie ticket of AMC® grand, may be stored in external server 120 linked to the registered application.

For example, if a narrative application registers the "AMC® grand" application and the narrative application receives at least one user input to select "watch a movie" from a list of actions, the narrative application may receive one or more UI fields or windows to facilitate a "book a ticket" function; an indication of "14:00" or "2:00 p.m." as a starting time for execution of the function; "00:05" as a duration of execution of the function; "home" as a location of execution of the function, etc. Such information regarding execution of the function may be stored in computing device 130 and be transmitted to the narrative application that may utilize such information to write a story when a user utilizes the "AMC® grand" application) for booking a movie ticket.

In addition, in order to include more specific story of the user's life, the narrative application may receive, from external server 120; "Dark Knight" as a movie title; "16:00" or "4:00 p.m." as a starting time for the movie; "Beverly Center" as the location of a desired movie theater, etc. Further, the narrative application requests background information regarding the "Dark Knight" from external server 120 associated with the "AMC® grand" application to generate a more specific and/or interesting story for the user. Thus, the narrative application may retrieve and/or receive, from external server 120, promotional images and/or videos for the Dark Knight, information regarding the director, reviews of the Dark Knight, information regarding actors in the Dark Knight, etc., which may be stored in external server 120 associated with the "AMC® grand" application.

After the narrative application receives a history of the action. The history may include information such as an executed function, an execution time, an execution location, etc., the narrative application may generate a narrative to be viewed on a user interface of the computing device 130 based on the received usage history of the action corresponding to the registered application. For example, after a user has booked a ticket for Dark Knight using the "AMC® grand" application, which has been registered by the narrative application, and the user further selects the action "watch movie" using the "AMC® grand" application, the narrative application may generate a narrative to record such actions in one or more of various narrative formats.

Figure 8:
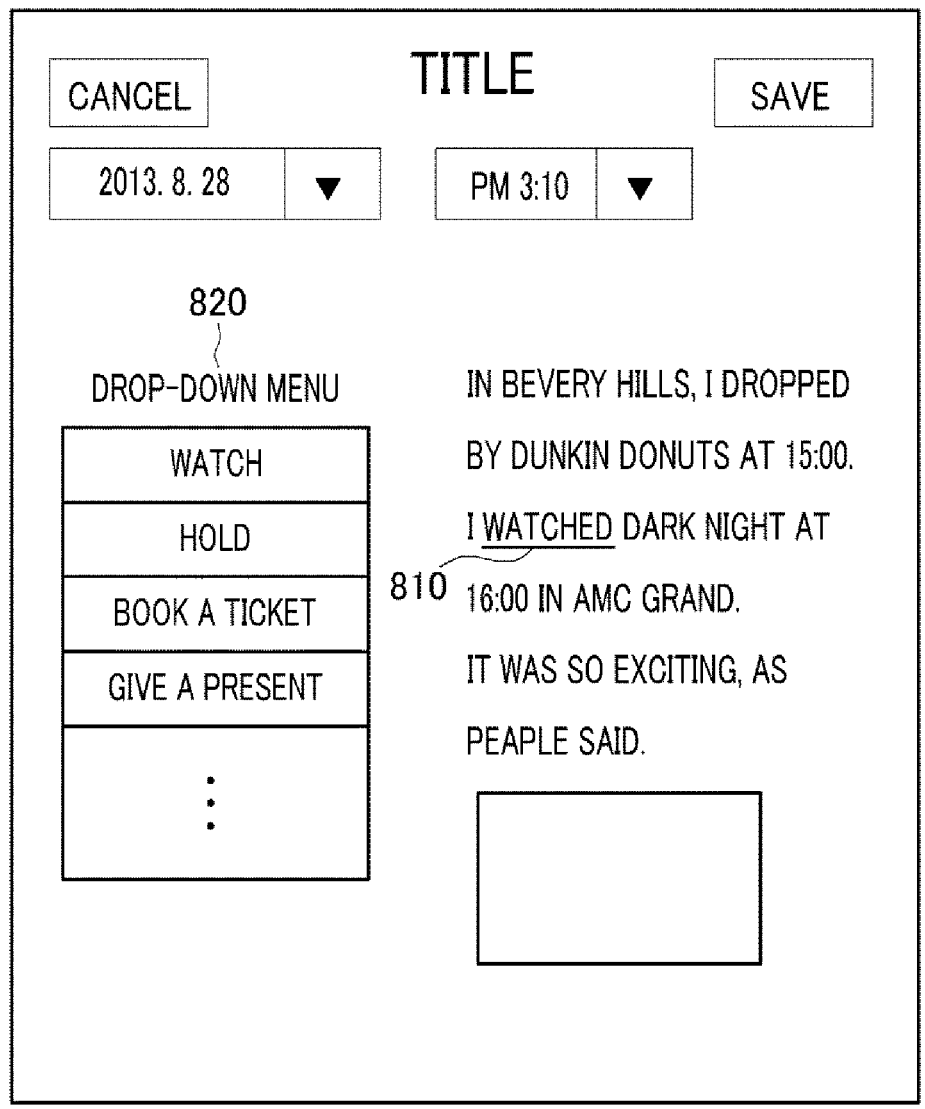
FIG. 8 shows another illustrative user interface by which at least portions of a narrative generating scheme may be implemented, in accordance with various embodiments described herein.

As depicted in FIG. 8, the narrative application may display a narrative, "In Beverly Hills, I dropped by the Dunkin Donuts® at 3:00 p.m. After that, I watched Dark Knight at 4:00 p.m. at the AMC® Grand Theater. It was so exciting, as people said" based on the predefined expression stored in computing device 130 such as "It was so exciting, as people said."

Further, when the narrative application requests background information regarding the Dark Knight to external server 120 associated with the "AMC® grand" application to generate a more interesting and/or specific story for the user, the narrative application may retrieve and/or receive, from external server 120, promotional images and/or videos for the "Dark Knight," information regarding the director, reviews of the "Dark Knight," information regarding actors in the "Dark Knight," etc., which may be stored in external server 120 associated with the "AMC® grand" application.

After the narrative application generates the narrative, the narrative application may be configured to display at least part of the generated narrative and highlight at least one of the actions in the displayed narrative. The highlighting may include underlining and/or coloring. Then, the narrative application may receive an input to revise the highlighted action or to add new information to the highlighted action, e.g. one or more user inputs to selection another action in the pop-up menu or drop-down menu on which a list of actions may be displayed, or user input to type other action in an appropriate UI field or window.

For example, based on the generated narrative, "I watched the Dark Knight at 4:00 p.m. at the AMC® Grand Theater. It was so exciting, as said the reviews stated." If the narrative application receives one or more user inputs to select "watched" and also to select "give a present" in a pop-up menu or a drop-down menu, the narrative application may display, alternatively or additionally, a revised narrative that indicates, as a non-limiting example, "I gave my friend a ticket to watch the Dark Knight. He should like it, since the reviews have been good."

Further, after the narrative application generates the narrative, the narrative application may be configured to insert, to the narrative, at least one picture taken when receiving the recorded usage history of the actions corresponding to the application. In addition, the narrative application may transmit the generated narrative to external server 120 to be shared through the Internet.

Thus, FIG. 1 shows example system 10 in which one or more embodiments of a narrative generating scheme may be implemented, in accordance with various embodiments described herein.

Figure 2:
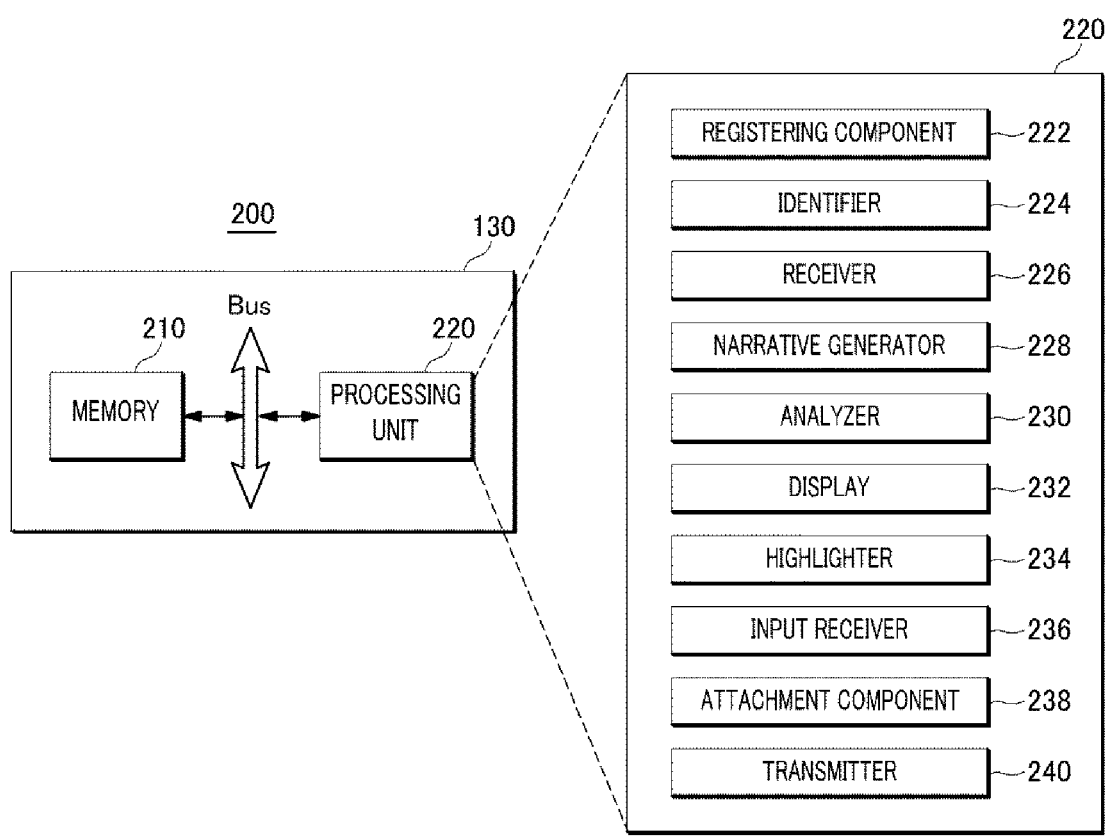
FIG. 2 shows an example device by which at least portions of a narrative generating scheme may be implemented, in accordance with various embodiments described herein.

FIG. 2 shows an example device by which at least portions of a narrative generating scheme may be implemented, in accordance with various embodiments described herein. For example, as depicted in FIG. 2, computing device 130 may include memory 210 configured to store narratives and processing unit 220.

Processing unit 220 may include a registering component 222 configured to register an application from among a plurality of applications installed on a mobile device, an identifier 224 configured to identify at least one action corresponding to the application, a receiver 226 configured to receive recorded usage history of the at least one action corresponding to the application, a narrative generator 228 configured to generate a narrative, based on the received usage history of the at least one action corresponding to the application, and an analyzer 230 configured to collect and analyze external data transmitted from an external server.

Processing unit 220 may further include a display 232 configured to display at least part of the generated narrative, a highlighter 234 configured to highlight the at least one action in the displayed narrative, an input receiver 236 configured to receive an input to revise the at least one action or to add new information to the at least one action, an attachment component 238 configured to attach, to the narrative, at least one file (e.g. picture, video file, audio file), and a transmitter 240 configured to transmit the narrative to an external server.

In some embodiments, if a narrative application generates a plurality of narratives, then memory 210 may be configured to store the plurality of narratives. Further, processing unit 220 may be configured to read the narrative application's instructions received from a user's inputs, e.g., mouse click, touch input, stylus input, voice command, gesture command, etc.

In accordance with the narrative application's instruction, registering component 222 may be configured to register one of the third party applications including the "Amazon® Kindle Store" application that facilitates purchases and downloads of E-books, the "Yahoo!® music" application that facilitates purchases and downloads of music, the "AMC® grand" application that facilitates ticket purchases for movies, the "TNT®" application that provides, e.g., viewing guides for the corresponding TV channel, the "BluePay®" application that facilitates mobile payments payment), or the "Angry Bird®" game application, etc.

Identifier 224 may be configured to identify one or more user actions that may be taken while using the registered narrative application. Such actions may be predefined by the narrative application and stored in computing device 130. As an example of identifying user actions, display 232 may display the predefined list of actions in a drop-down menu of a pop-up window corresponding to the registered application.

Then, input receiver 236 may receive one or more user inputs to select at least one action from the predefined list of actions in the drop-down menu, e.g. by clicking selections of the one or more actions. Based on the one or more user inputs, identifier 224 may identify the one or more actions that may be taken while using the registered narrative application.

Receiver 226 may be configured to receive recorded usage history of at least one action of the actions corresponding to the registered third party application transmitted from external server 120 and computing device 130. The recorded usage history of the at least one action corresponding to the registered application may include an executed function, an execution time, an execution location of the at least one application, along with a title, a starting time, and a location transmitted from external server 120.

Further, the recorded usage history of the at least one action corresponding to the application may include an image, a rating, an author, an actor/actress and a review associated with the application. In addition to the received usage history of the action, analyzer 230 may be configured to collect and analyze external data including the image, the rating, the author, the actor/actress and the review associated with the application transmitted from an external server 120 that are associated with the recorded usage history.

For example, if registering component 222 registers "Amazon® Kindle Store" (E-book application) and identifier 224 identifies "read" as an action, receiver 226 may receive "interest" as executed function, "14:10" as starting time for execution, "00:01" as execution duration, "home" as execution location.

In addition, receiver 226 may receive, from external server 120, "Life Lesson" as book title that may be included in the received usage history. In addition to the recorded usage history, analyzer 230 may collect and analyze, as external data, images of Life Lesson, the author's information, review about Life Lesson, and other people's rating of Life Lesson transmitted from external server 120.

Narrative generator 228 may be configured to generate a narrative to be viewed on a user interface of the computing device 130 based on the received usage history of the action corresponding to the registered application. For example, after a user has read "The Great Gatsby" and the user has further selected the action "read," both using the "Yahoo® books" application, registering component 222 may register the "Yahoo!® books" application. Then, registering component 222 may receive the "Yahoo!® books" application ID from an OS running on computing device 130 and store the "Yahoo!® books" application ID. Further, registering component 222 may call an API function provided by the "Yahoo!® books" application to get recorded data regarding the "Yahoo!® books" application from external server 120 or computing device 130. Then, identifier 224 may identify "read" as a selected action for the "Yahoo!® books" application. Then, narrative generator 228 may generate the first narrative to record such actions in one or more of various narrative formats.

That is, display 232 may display "I read The Great Gatsby starting at 14:00 for 30 minutes. I eventually finished reading it after starting it six months ago. I do not like this book despite the high rating because it is so boring to read." Receiver 226 may also receive, from external server 120, images of The Great Gatsby, information regarding the author F. Scott Fitzgerald, ratings from the registered application, etc.

As another example, after a user has booked a ticket for the "Dark Knight" using the "AMC® grand" application, which has been registered by the narrative application, and the user further selects the action "watch movie" using the "AMC® grand" application, narrative generator 228 may generate the second narrative to record such actions in one or more of various narrative formats.

Display 232 may display a narrative, "In Beverly Hills, I dropped by the Dunkin Donuts® at 3:00 p.m. After that, I watched Dark Knight at 4:00 p.m. at the AMC® Grand Theater. It was so exciting, as people said" based on the predefined expression stored in computing device 130 such as "It was so exciting, as people said."

Narrative generator 228 may be configured to generate the first and the second narratives based on execution count of the corresponding applications. The execution count may indicate how many times the corresponding applications have been used during a certain period of time. For example, if the Yahoo!® books application has been executed three times in a week while the AMC® grand application has been executed once a month, display 232 may display, on a user interface of computing device 130, the first narrative generated based on Yahoo!® books before the second narrative generated based on AMC® grand.

As another example of identifying at least one action, identifier 224 may identify a category of the registered application and display a predefined list of actions stored in computing device 130 corresponding to the category of the application. Then, input receiver 236 may receive one or more user inputs to select at least one action from the list of actions.

For example, if registering component 222 registers "Amazon® Kindle Store" and "Google® eBook", identifier 224 may determine based on metadata of the two applications that "Amazon® Kindle Store" and "Google® eBook" are both "E-book" store applications. Then, display 232 may display the same predefined list of actions corresponding to all registered "E-book" store application.

Processing unit 220 may be configured to revise the generated narrative or add new information to the generated narrative. Display 232 may display at least part of the generated narrative, and highlighter 234 may highlight at least one action in the displayed narrative. The highlighting may include underlining and/or coloring.

Input receiver 236 may receive an input to revise the highlighted action or to add new information to the highlighted action, e.g. one or more user inputs to selection another action in the pop-up menu or drop-down menu on which a list of actions may be displayed, or user input to type other action in an appropriate UI field or window.

For example, based on the generated narrative, "I watched Dark Knight at 4:00 p.m. at the AMC® Grand Theater. It was so exciting, as people said." if the narrative application receives one or more user inputs to select "watched" and also to select "give a present" in a pop-up menu or a drop-down menu, the narrative application may display, alternatively or additionally, a revised narrative that indicates, as a non-limiting example, "I gave a my friend a ticket to watch the Dark Knight. He should like it, since the reviews have been good."

Further, attachment component 238 may attach, to the narrative, at least one file (e.g. picture, video file, audio file) such as Dark Knight Poster, spoiler or advertisement video clip of Dark Knight. In addition, transmitter 240 may transmit the narrative to an external server to be shared with other people through Internet.

Thus, FIG. 2 shows example device 130 by which one or more embodiments of a narrative generating scheme may be implemented, in accordance with various embodiments described herein.

FIG. 3 shows an example table 300 implemented by at least portions of a narrative generating scheme, in accordance with various embodiments described herein. Memory 210 may be configured to store table 300 in which action ID 310 and action 320 matching with action ID 310 are listed. Table 300 may be predefined by a developer of the narrative application. Also, action 320 may include actions that may be predefined by a narrative application to generate a narrative based on recorded history of actions.

Action 320 may include user-defined actions and a user may attach additional actions to action 320 or delete one or more of actions included in action 320. For example, actions "READ", "HOLD", "RATE", "WATCH", "LISTEN", "DOWNLOAD", "PLAY", "BUY", and "GIVE A PRESENT TO" may respectively match with action ID 1 to 10.

Thus, FIG. 3 shows an example table 300 implemented by at least portions of a narrative generating scheme, in accordance with various embodiments described herein.

Figure 4:
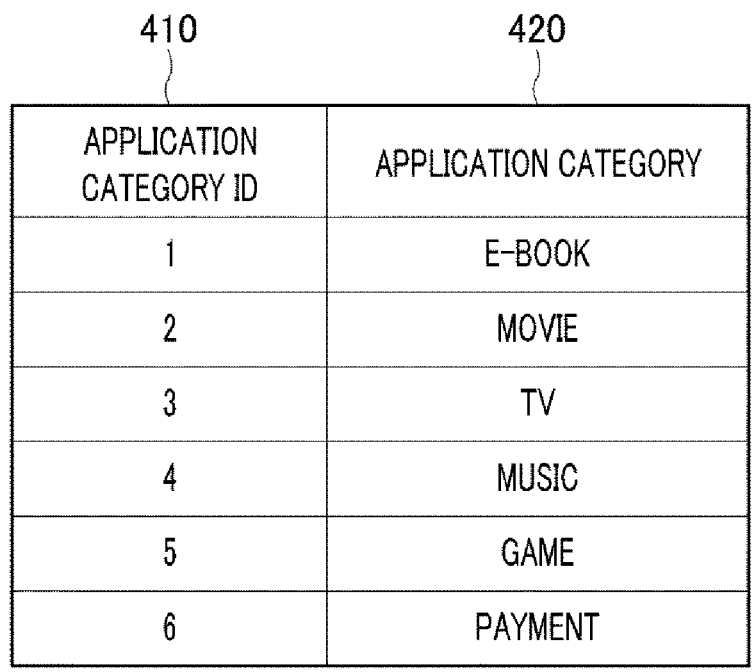
FIG. 4 shows another example table implemented by at least portions of a narrative generating scheme, in accordance with various embodiments described herein.

FIG. 4 shows another example table 400 implemented by at least portions of a narrative generating scheme, in accordance with various embodiments described herein. Memory 210 may be configured to store table 400 in which application category ID 410 and application category 420 matching with application category ID 410 are listed. Table 400 may be predefined by a developer of the narrative application. For example, application category "E-BOOK", "MOVIE", "TV", "MUSIC", "GAME", "PAYMENT" may respectively match with application category ID 1 to 6.

Thus, FIG. 4 shows another example table 400 implemented by at least portions of a narrative generating scheme, in accordance with various embodiments described herein.

FIG. 5 shows another example table 500 implemented by at least portions of a narrative generating scheme, in accordance with various embodiments described herein. Processing unit 220 may be configured to analyze an application category of the third party application registered to a narrative application, for example, by analyzing the third party application metadata or by receiving an input of the application category from the user.

As depicted in FIG. 5, application category 530 determined based on the analysis may be stored in application information table 500 with matched application ID 510 and application title 520. For example, if application ID 510 "1" matches with application title 520 "Amazon® Kindle Store", table 500 may store "1" in application category 530 representing E-books together with the corresponding application ID and application title.

If application ID 510 "2" matches with application title 520 "Yahoo!® music", table 500 may store "4" in application category 530 representing music together with the corresponding application ID 510 and application title 520.

If application ID 510 "3" matches with application title 520 "AMC® grand," table 500 may store application category 530 "2" representing movies together with the corresponding application ID 510 and application title 520.

If application ID 510 "4" matches with application title 520 "TNT®", table 500 may store application category 530 "3" representing TV together with the corresponding application ID 510 and application title 520.

If application ID 510 "5" matches with application title 520 "BluePay®," table 500 may store application category 530 "6" representing payment together with the corresponding application ID 510 and application title 520.

If application ID 510 "6" matches with application title 520 "Angry Bird®", table 500 may store application category 530 "5" representing game together with the corresponding application ID 510 and application title 520.

Thus, FIG. 5 shows another example table 500 implemented by at least portions of a narrative generating scheme, in accordance with various embodiments described herein.

FIG. 6 shows another example table 600 implemented by at least portions of a narrative generating scheme, in accordance with various embodiments described herein. Table 600 describes a table recording usage history of the identified action corresponding to the registered third party application. In some embodiments, after processing unit 220 identifies at least one action, processing unit 220 may be configured to receive recorded usage history of the at least one action corresponding to the registered third party application transmitted from external server 120 and computing device 130.

The recorded usage history may include application ID 610, application category 611, executed function 612, execution time 613, execution duration 614, and execution location 615. Also, the recorded usage history may include a title 616, a starting time 617, and a location 618 transmitted from external server 120.

For instance, processing unit 220 may receive, from "AMC® grand" application, application ID 610 "3 AMC® grand", application category 611 "2 movies" execution function 612 "book a ticket". Then, processing unit 220 may receive that execution time 613 of "AMC® grand" corresponds to 14:00, that execution duration 614 corresponds to 00:05, and that execution location 615 corresponds to home.

When "AMC® grand" may request further information to external server 120, processing unit 220 may further receive external data such as title 616 "Dark Knight", starting time 617 "16:00 movie time", and location 618 "Beverly Center". Such external data may be received by calling API provided by "AMC® grand" application developer, or by requesting a server managed by "AMC® grand" developer.

For other example, processing unit 220 may receive, from "Amazon® Kindle Store" application, application ID 610 "1 Amazon® Kindle Store", application category 611 "1 E-book", execution function 612 "interest (favorite)". Then, processing unit 220 may receive that execution time 613 of "Amazon® Kindle Store" is 14:10, that execution duration 614 is 00:01, and that execution location 615 is home. In case that "Amazon® Kindle Store" communicates with external server 120, processing unit 220 may further receive external data such as title 616 "Life Lesson".

For instance, processing unit 220 may receive, from "Amazon® Kindle Store" application, application ID 610 "1 Amazon® Kindle Store", application category 611 "1 E-book", execution function 612 "read". Then, processing unit 220 may receive that execution time 613 of "Amazon® Kindle Store" is 14:10, that execution duration 614 is 00:30, and that execution location 615 is home. In case that "Amazon® Kindle Store" communicates with external server 120, processing unit 220 may further receive external data such as title 616 "The Great Gatsby".

Thus, FIG. 6 shows another example table 600 implemented by at least portions of a narrative generating scheme, in accordance with various embodiments described herein.

FIG. 7 shows an illustrative user interface 700 by which at least portions of a narrative generating scheme may be implemented, in accordance with various embodiments described herein. Processing unit 220 may be configured to generate a narrative, based on the received usage history of the at least one action corresponding to the registered application and external data transmitted from an external server that are associated with the recorded usage history.

For example, processing unit 220 may generate the first narrative 710 associated with application ID "1 Amazon® Kindle Store." After processing unit 220 registers "Amazon® Kindle Store" and receives a user input of "hold" and executed function "interest" in a book titled "Life Lesson", processing unit 220 may generate the first narrative 710 including an expression of "hold" combined with "Life Lesson".

For example, processing unit 220 may generate the first narrative 710 of "I am interested in Life Lesson. Please place this on hold." In addition, processing unit 220 may display a book cover for Life Lesson, information regarding the book's author, and the rating transmitted from external server 120.

For another example, processing unit 220 may generate the second narrative 720 associated with application ID "2 Amazon® Kindle Store". After processing unit 220 registers "Amazon® Kindle Store" and receives a user input of "read" and executed function "read" in a book titled "The Great Gatsby", processing unit 220 may generate the second narrative 720 including an expression of "read" combined with "The Great Gatsby."

That is, processing unit 220 may generate the second narrative 720 of "I had read The Great Gatsby at 14:00 for 30 minutes. I eventually finished reading it, since I started reading it six months ago. I do not like this book, because it is so boring", based on the predefined expression stored in computing device 130 such as "I do not like this book, because it is so boring."

As yet another example, processing unit 220 may generate the third narrative 730 associated with application ID "3 AMC® grand". After processing unit 220 registers "AMC® grand" and receives a user input of "watch" and execution function "watch" for the movie "Dark Knight," processing unit 220 may generate the third narrative 830 including an expression of "watch" combined with "Dark Knight."

That is, processing unit 220 may generate the third narrative 830 of "In Beverly Hills, I dropped by Dunkin Donuts® at 15:00. I watched Dark Knight at 16:00 in the AMC® grand. It was so exciting, as people said," based on the predefined expression stored in computing device 130 such as "It was so exciting, as people said."

Thus, FIG. 7 shows an illustrative user interface 700 by which one or more embodiments of a narrative generating scheme may be implemented, in accordance with various embodiments described herein.

FIG. 8 shows another illustrative user interface 800 by which at least portions of a narrative generating scheme may be implemented, in accordance with various embodiments described herein. Processing unit 220 may be configured to display at least part of the generated narrative, to highlight one or more actions in the displayed narrative, and to receive an input to revise the actions or to add new information to the actions.

As depicted in FIG. 8, the action 810 "watch" may be underlined or colored as a means of highlighting. With regard to the highlighted action 810, processing unit 220 may receive a user input to replace "watch" with replacement action 640 "give a present", e.g. by clicking "give a present" in drop-down menu 820, or by deleting "watch" and typing in the UI field or window "give a present".

In addition, to add more actions to the predefined action "watch," processing unit 220 may display an "add" icon beside a "watch" icon to receive one or more actions that a user may type, when a user clicks a right mouse button. Further, processing unit 220 may attach, to the narrative 810, at least one picture taken when receiving the recorded usage history of the at least one action corresponding to the application. Processing unit 220 may transmit the narrative 810 to external server 120 to be shared through the Internet.

Thus, FIG. 8 shows another illustrative user interface 800 by which one or more embodiments of a narrative generating scheme may be implemented, in accordance with various embodiments described herein.

FIG. 9 shows an example processing flow of operations, by which at least portions of a narrative generating scheme may be implemented, in accordance with various embodiments described herein. The operations of processing flow 900 may be implemented in system configuration 10 including network 110, external server 120, and computing device 130, as illustrated in FIG. 1.

Processing flow 900 may include one or more operations, actions, or functions as illustrated by one or more blocks 910, 920, 1030 and/or 1040. Although illustrated as discrete blocks, various blocks may be divided into additional blocks, combined into fewer blocks, or eliminated, depending on the desired implementation. Processing may begin at block 910.

Block 910 (register application) may refer to a narrative application downloaded and hosted on computing device 130 for generating a user's narrative based on recorded history of actions. The narrative application downloaded and hosted on computing device 130, may register a third-party mobile application (hereinafter referred to as "the third-party application"), which may be one of a plurality of mobile applications that are also downloaded from one or more of the application distribution platforms and installed on computing device 130. According to some embodiments, a user of computing device 130 may drag an icon or representation of the third-party application onto an icon or representation of the narrative application on a user interface (UI) of computing device 130. Processing may proceed from block 910 to block 920.

Block 920 (identify action corresponding to application) may refer to the narrative application identifying one or more user actions that may be taken while using the registered narrative application. The actions may be a user defined-actions implemented by computing device 130.

As an example of identifying at least one action, the registered narrative application may display the predefined list of actions in a drop-down menu of a pop-up window corresponding to the registered application. Then, the narrative application may receive one or more user inputs to select at least one action from the predefined list of actions in the drop-down menu, e.g. by clicking selections of the one or more actions.

As non-limiting example of the actions list, if the narrative application registers "Amazon® Kindle Store", the narrative application may display in, e.g., a pop-up window or drop-down menu, a predefined list of actions, including as non-limiting examples "read," "hold," "like," "dislike," "purchase", "read again," "highlight," "annotate," "preview," etc., using a UI on computing device 130 or the narrative application server. Processing may proceed from block 920 to block 930.

Block 930 (receive recorded usage history pertaining to action) may refer to the narrative application receiving recorded usage history of the at least one action corresponding to the registered third party application transmitted from external server 120 and computing device 130.

The recorded usage history of the at least one action corresponding to the registered application may include an executed function, an execution time, an execution location of the at least one application, along with a title, a starting time, and a location transmitted from external server 120. Further, the recorded usage history of the at least one action corresponding to the application may include an image, a rating, an author, an actor/actress and a review associated with the application.

The information regarding the executed function, the execution time, and the execution location may be stored in computing device 130, and the narrative application may receive such information transmitted from computing device 130 by calling application programming interfaces (APIs), because the usage record of applications installed on computing device 130 may be stored in computing device 130.

On the contrary, the information regarding the title, the starting time, and the location may be stored in external server 120 linked to the registered application, and the narrative application may receive such information transmitted from external server 120 by calling application programming interfaces (APIs). The information regarding a subject matter of the registered application, e.g. e-Book of Amazon® Kindle Store or a movie ticket of AMC® grand, may be stored in external server 120 linked to the registered application. Processing may proceed from block 930 to block 940.

Block 940 (generate narrative based on usage history) may refer to the narrative application generating a narrative to be viewed on a user interface of the computing device 130 based on the received usage history of the action corresponding to the registered application. For example, after a user has booked a ticket for Dark Knight using the "AMC® grand" application, which has been registered by the narrative application, and the user further selects the action "watch movie" using the "AMC® grand" application, the narrative application may generate a narrative to record such actions in one or more of various narrative formats.

That is, the narrative application may display a narrative, "In Beverly Hills, I dropped by the Dunkin Donuts® at 3:00 p.m. After that, I watched Dark Knight at 4:00 p.m. at the AMC® Grand Theater. It was so exciting, as people said" based on the predefined expression stored in computing device 130 such as "It was so exciting, as people said."

Thus, FIG. 9 shows an example processing flow 900 of operations by which at least portions of a narrative generating scheme may be implemented, in accordance with various embodiments described herein.

FIG. 10 shows an illustrative computing embodiment, in which any of the processes and sub-processes of a narrative generating scheme may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 1000 may typically include, at least, one or more processors 1002, a system memory 1004, one or more input components 1006, one or more output components 1008, a display component 1010, a computer-readable medium 1012, and a transceiver 1014.

Processor 1002 may refer to, e.g., a microprocessor, a microcontroller, a digital signal processor, or any combination thereof.

Memory 1004 may refer to, e.g., a volatile memory, non-volatile memory, or any combination thereof. Memory 1004 may store, therein, an operating system, an application, and/or program data. That is, memory 1004 may store executable instructions to implement any of the functions or operations described above and, therefore, memory 1004 may be regarded as a computer-readable medium.

Input component 1006 may refer to a built-in or communicatively coupled keyboard, touch screen, or telecommunication device. Alternatively, input component 1006 may include a microphone that is configured, in cooperation with a voice-recognition program that may be stored in memory 1004, to receive voice commands from a user of computing device 1000. Further, input component 1006, if not built-in to computing device 1000, may be communicatively coupled thereto via short-range communication protocols including, but not limitation, radio frequency or Bluetooth.

Output component 1008 may refer to a component or module, built-in or removable from computing device 1000, that is configured to output commands and data to an external device.

Display component 1010 may refer to, e.g., a solid state display that may have touch input capabilities. That is, display component 1010 may include capabilities that may be shared with or replace those of input component 1006.

Computer-readable medium 1012 may refer to a separable machine readable medium that is configured to store one or more programs that embody any of the functions or operations described above. That is, computer-readable medium 1012, which may be received into or otherwise connected to a drive component of computing device 1000, may store executable instructions to implement any of the functions or operations described above. These instructions may be complimentary or otherwise independent of those stored by memory 1004.

Transceiver 1014 may refer to a network communication link for computing device 1000, configured as a wired network or direct-wired connection. Alternatively, transceiver 1014 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Thus, FIG. 10 shows an illustrative computing embodiment, in which any of the processes and sub-processes of a narrative generating scheme may be implemented as computer-readable instructions stored on a computer-readable medium, in accordance with various embodiments described herein.

We claim:

1. A narrative method, comprising:
   registering, by a computing device, a first application and a second application from among a plurality of applications installed on a mobile device;
   identifying, by the computing device, at least one first action corresponding to the first application and at least one second action corresponding to the second application;
   receiving, by the computing device, first recorded usage history of the at least one first action corresponding to the first application and second recorded usage history of the at least one second action corresponding to the second application; and
   generating, by the computing device, a first narrative based on the received first usage history of the at least one first action corresponding to the first application and a second narrative based on the received second usage history of the at least one second action corresponding to the second application, wherein the first narrative and the second narrative are displayed in an order determined based on respective execution counts of the first application and the second application.

2. The method of claim 1, wherein the identifying comprises:
   displaying respective lists of actions capable of being performed using the first application and the second application, and
   receiving a first input to select the at least one first action from a first list of actions corresponding to the first application and a second input to select the at least one second action from a second list of actions corresponding to the second application.

3. The method of claim 1, wherein the identifying comprises:
   identifying respective categories of the applications;
   displaying respective lists of actions corresponding to the respective categories of the applications; and
   receiving respective inputs to select the at least one first action and second action from the respective lists of actions.

4. The method of claim 1, wherein the identifying comprises receiving at least one respective user-defined-actions corresponding to the respective applications.

5. The method of claim 1, wherein the first recorded usage history of the at least one first action corresponding to the first application and the second recorded usage history of the at least one second action corresponding to the second application includes:
   at least one of an executed function;
   an execution time;
   an execution location; and
   at least one of an object title, an object time, and an object location transmitted from an external server.

6. The method of claim 5, wherein the first recorded usage history of the at least one first action corresponding to the first application and the second recorded usage history of the at least one second action corresponding to the second application further includes an image, a rating, an author, an actor/actress and a review associated with the respective applications.

7. The method of claim 1, further comprising:
   displaying at least part of the generated narratives;
   highlighting the at least one first action or the at least one second action in the displayed narrative; and
   receiving an input to revise the at least one first action or the at least one second action, or to add new information to the at least one first action or the at least one second action.

8. The method of claim 7, further comprising:
   inserting, to the first narrative, at least one picture taken when receiving the first recorded usage history of the at least one first action corresponding to the first application; or
   inserting to the second narrative, at least one picture taken when receiving the second recorded usage history of the at least one second action corresponding to the second application.

9. The method of claim 8, further comprising:
   transmitting the first and second narratives to an external server to be shared through the Internet.

10. A computing device, comprising:
    a memory configured to store narratives; and
    a processing unit configured to:
    register a first application and a second application from among a plurality of applications installed on a mobile device, identify at least one first action corresponding to the first application and at least one second action corresponding to the second application, receive first recorded usage history of the at least one first action corresponding to the first application and second recorded usage history of the at least one second action corresponding to the second application, and generate a first narrative, based on the received first usage history of the at least one first action corresponding to the first application and a second narrative, based on the received second usage history of the at least one second action corresponding to the second application, wherein the first narrative and the second narrative are displayed in an order determined based on respective execution counts of the first application and the second application.

11. The computing device of claim 10, wherein the processing unit is further configured to:

collect and analyze external data transmitted from an external server that are associated with the first recorded usage history and the second recorded usage history, and generate the first narrative and the second narrative, based on the external data.

12. The computing device of claim 10, wherein the identifying includes:

identifying respective categories of the applications, displaying respective lists of actions corresponding to the respective categories of the applications, and receiving respective inputs to select the at least one first action and the at least one second action from the respective lists of actions.

13. The computing device of claim 10, wherein the processing unit is further configured to generate the narratives based on respective execution durations of the applications.

14. The computing device of claim 10, wherein the processing unit is configured to:

display at least part of the generated narratives, highlight the at least one first action or second action in the displayed narratives; and receive an input to revise the at least one first action or second action, or to add new information to the at least one first action or second action.

15. The computing device of claim 10, wherein the processing unit is further configured to:

insert, to the first narrative, at least one picture taken when receiving the first recorded usage history of the at least one first action corresponding to the first application or insert, to the second narrative, at least one picture taken when receiving the second recorded usage history of the at least one second action corresponding to the second application, and transmit the narratives to an external server to be shared through the Internet.

16. A non-transitory computer-readable storage medium having thereon computer-executable instructions that, in response to execution, cause a device to perform operations, comprising:

registering a first application and a second application from among a plurality of applications installed on a mobile device;

identifying at least one first action corresponding to the first application and at least one second action corresponding to the second application;

receiving first recorded usage history of the at least one first action corresponding to the first application and second recorded usage history of the at least one second action corresponding to the second application; and generating a first narrative, based on the received first usage history of the at least one first action corresponding to the first application and a second narrative based on the received second usage history of the at least one second action corresponding to the second application, wherein the first narrative and the second narrative are displayed in an order determined based on respective execution counts of the first application and the second application.

17. The non-transitory computer-readable storage medium of claim 16, wherein the computer-readable storage medium comprises executable instructions to:

display respective lists of actions capable of being performed using the applications, and receive respective inputs to select the at least one first action and second action from the respective lists of actions.

18. The non-transitory computer-readable storage medium of claim 16, wherein the computer-readable storage medium comprises executable instructions to:

identify respective categories of the applications, display respective lists of actions corresponding to the respective categories of the applications, and receive respective inputs to select the at least one first action and second action from the respective lists of actions.

19. The non-transitory computer-readable storage medium of claim 16, wherein the computer-readable storage medium comprises executable instructions to:

collect and analyze external data transmitted from an external server that are associated with the first recorded usage history and the second recorded usage history, and generate the first narrative and the second narrative, based on the external data.

20. The non-transitory computer-readable storage medium of claim 16, wherein the computer-readable storage medium comprises executable instructions to:

display at least part of the generated narratives, highlight the at least one first action or second action in the displayed narratives; and receive an input to revise the at least one first action or second action or to add new information to the at least one first action or second action.

* * * * *